United States Patent [19]
Greenbaum

[11] Patent Number: 4,730,633
[45] Date of Patent: Mar. 15, 1988

[54] STRIPFLEX

[76] Inventor: George Greenbaum, 6770 E. Carondelet Dr. #218, Tucson, Ariz. 85710

[21] Appl. No.: 943,311

[22] Filed: Dec. 17, 1986

[51] Int. Cl.$^4$ ............................................. A01G 9/00
[52] U.S. Cl. ....................................... 135/93; 52/63; 135/101; 135/117; 47/17; 47/31
[58] Field of Search ................... 135/101, 87, 93, 117; 52/63; 49/34; 160/332, 178; 47/17, 31

[56] References Cited

U.S. PATENT DOCUMENTS

| | | | |
|---|---|---|---|
| 302,000 | 7/1884 | Keys | 52/63 |
| 2,986,150 | 5/1961 | Torian | 52/63 |
| 3,836,417 | 9/1974 | Yaeger | 52/63 |
| 3,989,396 | 11/1976 | Matsumoto | 52/721 |
| 4,092,992 | 6/1978 | Huddle | 52/63 |
| 4,109,440 | 8/1978 | Bill | 52/721 |
| 4,218,104 | 8/1980 | Anderson | 52/63 |
| 4,318,253 | 3/1982 | Wedel | 52/63 |
| 4,381,629 | 5/1983 | Ahn | 52/63 |

FOREIGN PATENT DOCUMENTS

| | | | |
|---|---|---|---|
| 1952639 | 5/1971 | Fed. Rep. of Germany | 52/63 |
| 2933360 | 7/1980 | Fed. Rep. of Germany | 49/34 |
| 1508336 | 1/1968 | France | 52/63 |

Primary Examiner—Henry E. Raduazo
Attorney, Agent, or Firm—Samuels, Gauthier, Stevens & Kehoe

[57] ABSTRACT

This invention relates to shelters which are readily adaptable in size and configuration to define an environment, preferably about plants, to control the amount of radiation, humidity, temperature and ventilation and to inhibit intrusion into the defined environment by deleterious vectors such as insects, unwanted microorganisms, weed seeds and the like.

21 Claims, 17 Drawing Figures

STRIPFLEX

BACKGROUND OF THE INVENTION

Several types of structures have been disclosed which is one form of another enclose plants. See for example, U.S. Pat. Nos. 2,193,062; 2,208,881; 2,840,400; 3,718,533; 3,872,621; 3,896,586; 4,012,867; 4,034,508; and 4,135,331; 4,160,340 and may application Ser. No. 696,164 filed Jan. 29, 1985.

My invention represents a unique structure which offers substantial protection against weather, insects and disease for field crops, gardens (outdoor), for greenhouses (indoor) and for human habiation. My invention embodies a system which is simple and flexible and can embrace literally all plants, vine and tree crops. Its basic common configuration can be easily changed and adapted for all three agricultural levels.

Broadly my invention is a low cost framework of uniquely modified PVC pipe and fittings in combination with ribbons of film which form a semi-permeable cover having certain desirable and special properties to insure the growth of healthy plants at the most economical levels.

Essentially, these ribbons, developed in either single or multiple tiers, become an effective multi-purpose barrier against the factors that have an negative impact on plant growth. Some of these factors are too intense sunlight, frost injury, excessive heat, airborne viral, fungal and bacterial diseases, weed seeds and flying and crawling insects.

With my invention, these threats are neutralized by custom tailoring the parameters that make up the ribbons such as adding specific light and heat reflecting films to normal light transmitting ribbons.

Additional layers or tiers of ribbons are used to impart insulating qualities to the barrier.

The number of tiers are adjusted so that ventilation, rain penetration and loss of moisture by evaporation are balanced very carefully and insects, airborne diseases and weed seed are screened out.

Further, the ribbons can be sprayed with an adhesive so they interdict the airborne "bad vectors". An additional blocking medium may be created by adding particles of finely divided abrasive particles which can be a deterrent to insects plus also help to deflect microorganisms.

Double walled ribbons can be filled with fluids to alter the temperature and act as solar heat storage vessels.

Multiple tiers can be so constructed so that flow or airborne particles will always be interupted by a barrier surface.

Films used for the ribbons include, but are not limited to, polyethylene, polypropylene, polyvinyls, polyesters, polyfluorinated films, polyolefins, aluminum foils, polyurethane and co-extrusions and laminates of the same. The films my be clear, tinted, white, opaque, metallized or translucent. Their surfaces may be smooth, embossed, crimped or woven; and the thickness 40 gauge to 6 mil and all ultra-violet resistant.

A shade screen, if used, may be mesh, either cloth or plastic. Barrier particles if used include sand, clay, glass, pumice, sulfur, gypsum, aluminum filings, aluminum foil, plastic, "sequins", and pesticides and combinations thereof.

By choosing a mix of film (clear, opaque or metallized), color, finish, width, adhesive, particle surface and number of tiers, a controlled atmosphere to substantially improve plant culture at lowest possible costs is provided.

The framework to support the ribbons comprises tubular pipe having a plurality of discs secured therein, the outer edges of the discs engaging the inner surface of the pipe. The discs are maintained in their spaced apart relationship by rods or the like.

Broadly my invention is a shelter-like structure which comprises a skeletal framework formed of specially designed pipe and tiers secured to the framework to define an enclosed environment, said tiers having an elongated saddle, ribbons secured to the saddle, said ribbons adapted to modify the solar transmission characteristics passing therethrough and to control the flow of air therethrough to thereby inhibit the entry of airborne particles into defined environment.

DESCRIPTION OF THE PREFERRED EMBODIMENT(S)

In the description of the preferred embodiment the frame will be described in reference to specially designed PVC tubes. However, any suitable materials of construction may be used. The size of the frame, the dimensions of the pipes and fittings, the technique for securing the frame to ground, and the weight of the ribbons used will depend upon the size of the plants to be protected, and the winds and rains (snow) to which it will be be subjected. These considerations will also determine the necessity of additional struts, braces etc.

Figure 1:
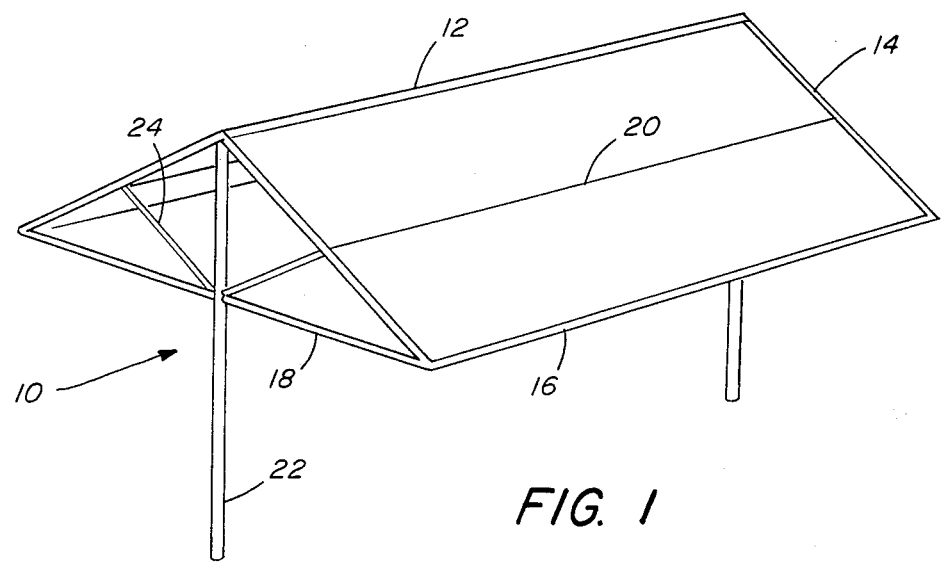
FIG. 1 is an illustration of a frame.

Referring to FIG. 1, a typical frame 10 of PVC tubes and fittings on which tiers may be secured comprises a ridge pole 12 joined to principal rafters 14 which in turn are joined to pole plates 16 and to a tie beam 18 for additional strength. To prevent sagging of the ribbons, purlines 20 are joined to the rafters 14. Additionally a vertical post 22 with supporting struts 24 are used at either end. The specific construction of these tubes is described in FIGS. 11 and 12.

Tiers are fabricated by slitting the flat film material to a determined width to form ribbons. These ribbons are draped on adhesive coated saddles and secured thereto to form the tiers. As used in this disclosure the term 'ribbons' includes in addition to flat strips, strings, cords and the like whether of natural or synthetic materials.

A plastic film (from 0.4 mil to 4–6 mils) is slit into strips from ⅛ inch to 12 inches wide (depending upon the ultimate use) and cut into various lengths. The ribbons used for the wall panels may be made of a very thin gauge film (40-60 gauge) so they can be moved even with the lightest wind. Alternatively, the ribbons can be a heavier gauge 3-6 mil and should remain relatively stable even in strong winds.

The random orientation of the ribbons allows air to penetrate the enclosure with the edges constantly contacting each other effectively preventing the entering of the most damaging kind of plant pests. The strips shown typically comprise clear polypropylene film, heat mirror film and mylar film. The ribbons will reduce evaporation from the leaves and soil, rains and/or snow can penetrate the roof. The roof ribbons can be formed of metallized ribbons to maintain a lower temperature within the enclosure. It is important to note that the ribbons when used as a wall can be pushed aside during the transit of farm vehicles so there is not interference in harvesting or seeding. During the pollination season, the ribbons can be opened for free movements of bees, etc.

Figure 2:
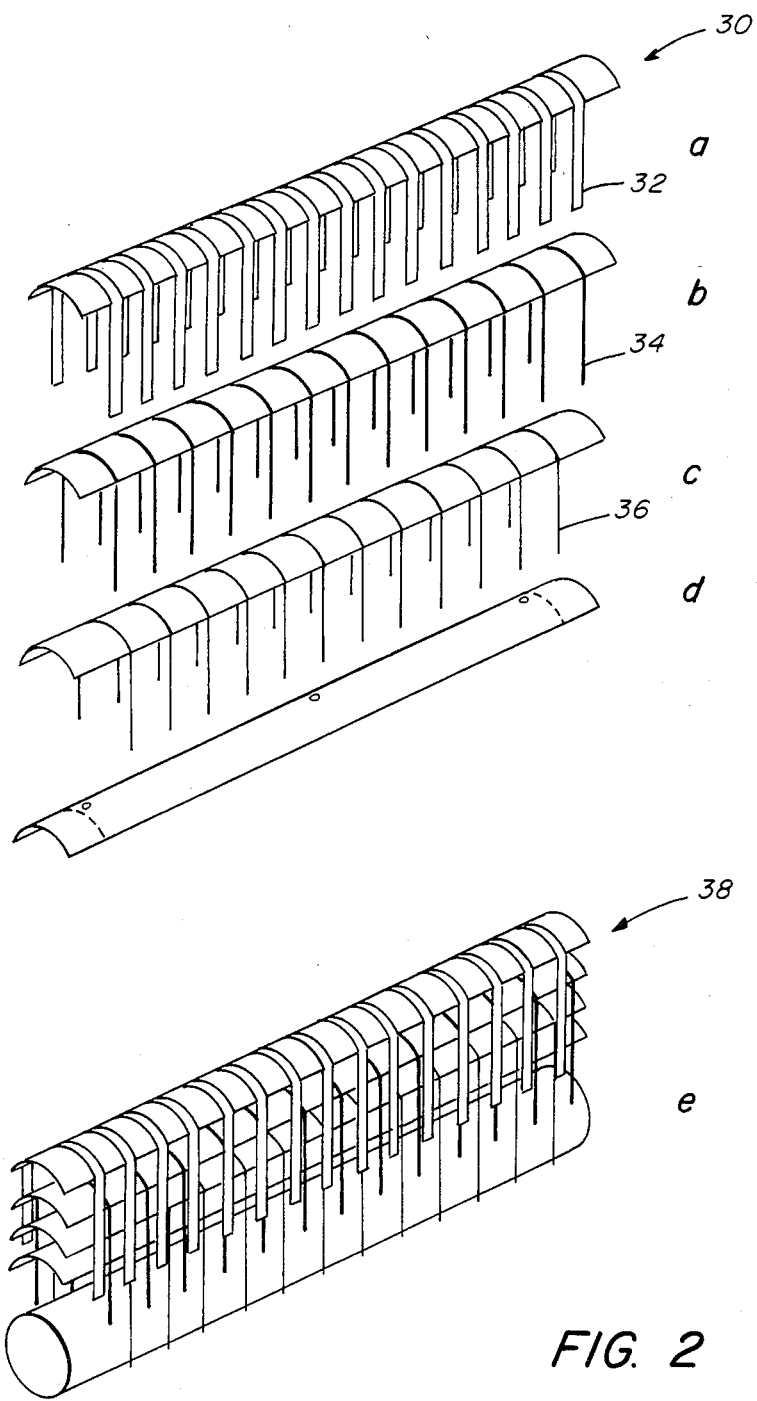
FIG. 2a-2e are multi-ribboned tiers.

Each saddle (and thereby tier) may have its own distictive ribbons as shown in FIGS. 2 a, b, c and e. By choosing the packing density (ribbons per lineal foot), and the different types of film, one can obtain a wide ranging combination of light and heat reflecting/transmittency properties. For example, changing the number of metallized film strips from say, 5 ribbons/lineal foot to 7, we would have a little less light coming through but the reflectivity of the roof section will increase dramatically.

Instead of using 3 or 4 different tiers, each carrying a specific ribbon, three or four different types of ribbons may be placed on the same carrier.

Referring to FIG. 2a, a tier 30 is shown with a dense ribbon packing of clear polyethylene film 32 ½" wide, 1.25 mil, 24 ribbons per foot.

Referring to FIG. 2b, a light ribbon of metallized plastic film 34 is shown, specifically polyester film, ½" wide, 1.0 mil, 2 ribbons per lineal foot.

Referring to FIG. 2c, a light ribbon packing of white opaque plastic film 36 is shown, specifically polyethylene film, ½" wide, 2.0 mil, 2 ribbons per lineal foot.

Referring to FIG. 2d, a saddle per se is shown.

Referring to FIG. 2e, the tiers of FIG. 2a–d are combined to form a single tier 38.

The tier 38 of FIG. 2e would be 8.3% white, 8.3% metallized. It is important to note that the tier is not impervious to sunlight and air. In this example, the percent sunlight allowed to pass through compared to no ribbons present would be approximately 83.4%. The movement of the wind would allow air to move the ribbons and pass through the defined enclosure. In regard to the solar transmission altering characteristics of the ribbons, reference is made to my corresponding application Ser. No. 806,033, filed Dec. 5, 1985 which application is hereby incorporated by reference in its entirety in this application for a disclosure of the types of ribbons (films) that can be used alone and in combination.

Alternatively, instead of securing a specific ribbon to a separate saddle, combinations of ribbons can be secured to a single saddle.

The function of the saddle is to serve as a substantially rigid, easy to handle heat resistant and compact cover to hold the ribbons securely in place and prevent their sliding. These saddles may be made of any materials of construction; metals, plastics (whether or not reenforced), or waterproof cardboards. Preferably, 10 mil extruded profile PVC is used. The tiers are secured to the frame by bolts, clamps, wire or the like. It should be noted that the saddles have a hole at each end, FIG. 2d, which serve a dual purpose. Not only do they help to secure the tier to the frame by passing bolts or fasteners through the saddle, but they also allow reuse of the saddle. If the ribbons are to be replaced, the saddle with the old strips is placed in a jig with pins holding the saddle in place at the terminal ends (there are no ribbons there because they are adhesive-free zones). The existing ribbons are torn or shaved away leaving the saddle free to be re-covered once more.

Figure 3:
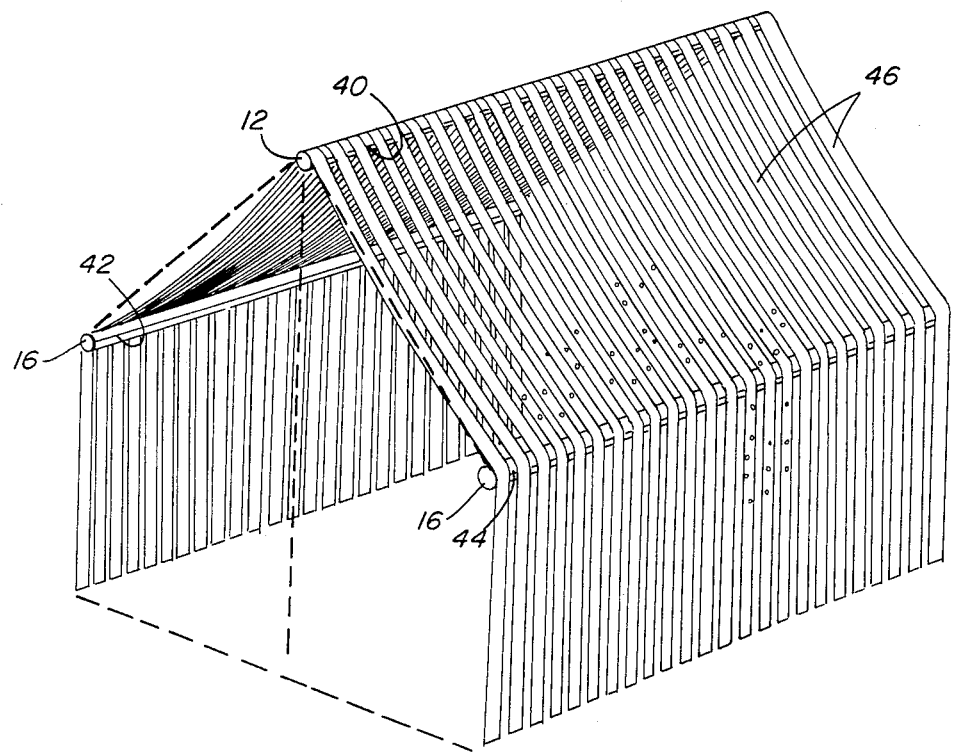
FIG. 3 is an illustration of a roof structure with the tier of FIG. 2.

Referring to FIG. 3, a tier comprises three saddles 42 and 44 secured to the ridge pole 12 and pole plates 16 respectively. Ribbon 46 extend from the saddle 40 to the saddles 42 and 44 and overlie and are secured to the outer surfaces of the saddles 42 and 44 have their free ends contacting the ground. The ends of the frame may be covered by triangular and rectangular wall sections as will be described. The ribbons 46 of the side wall sections of the tiers create a maze for effectively stopping airborne particles such as weed seeds and insects from penetrating the interior. The exterior ribbons may be sprayed with a lubricant, such as silicon, to prevent accumulation of dirt, etcetera on the ribbons.

The ribbons may be sprayed with adhesives and then dusted with various types of solid particles which with their substantially increased surface areas will offer a more effective barrier. By choosing particles that are quite abrasive to present a multi-layer seriers of barriers to almost anything that moves in the air. The ribbons may also be sprayed with insect repellents, insecticides, fungicides and herbicides.

Figure 4:
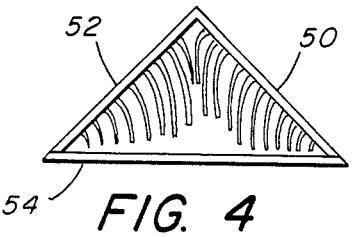
FIG. 4 is a front view of a triangular panel.

Referring to FIG. 4, two tiers 50 and 52 may be used as the legs of a triangle with a pipe 54 defining the base. This triangle can be used to enclose upper portion of the front and back of the frame 10 shown in FIG. 1.

Figure 5:
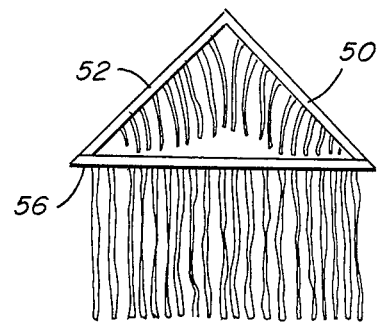
FIG. 5 is a front view of a modified triangular panel.

Alternatively, referring to FIG. 5, the base of the triangle is a tier 56, the depending ribbons of which cover the front and back wall portions of the frame shown in FIG. 1.

Figure 6:
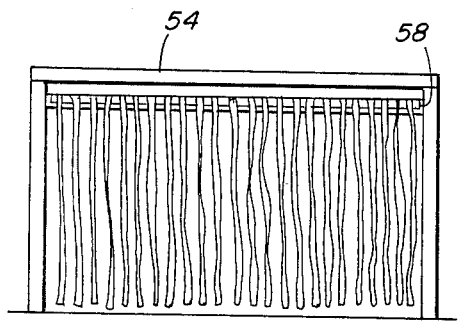
FIG. 6 is a front view of a side panel.

In FIG. 6, a wall tier 58 may be secured to the pipe 54 of FIG. 4 to enclose the front and back of the frame of FIG. 1, the ribbons hang freely with their ends touching the ground.

Figure 7:
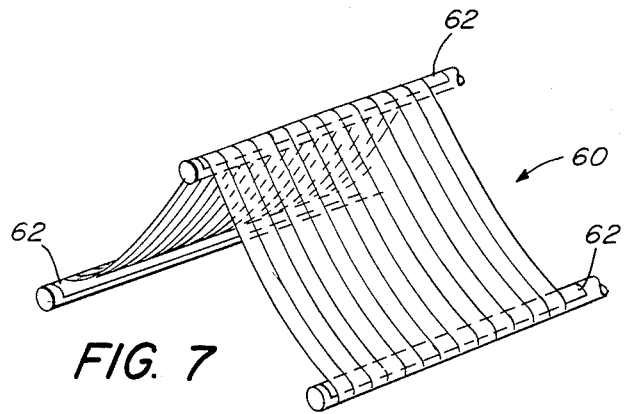
FIG. 7 is a perspective illustration of a roof section.

In FIG. 7, a roof assembly is shown at 60 and comprises three saddles 62 carrying a various assortment of ribbons. It is generally desirable to have the roof assembly fabricated separately from the wall assemblies. Typically, the roof assemblies are subject to more wear and tear. They may also embody solar energy characteristics which are not as necessary in the ribbons used for the sides of the structure.

Another variation of the ribbons is to cut so-called shade screening plastics (fine mesh netting) into ribbons. These ribbons used alone or in combination with other ribbons can alter heat/light radiation entering the defined environment.

The random deployment of one or two tiers of ribbons in the roof can furnish countless numbers of air-filled spaces that act as insulating pockets. This can prevent sudden frosts from excessively lowering internal temperatures.

The control of temperatures and light intensity in the interior space can be enhanced by "dusting". The ribbons are sprinkled with spangles ($\frac{1}{4}''$ disks) of aluminum foil or metallized film which spangles have an adhesive surface which adhere to the ribbons. By adjusting the amount of these tiny radiation reflecting particles adhering to the roof ribbons, the light and infra-red reflectivity of incoming solar energy is altered so that there is a high degree of control in these two wavelengths. The reflected light can also keep certain insects from entering.

The ribbons can be aluminum foil which can be electrically activated with negative/positive charges to attract or repel airborne insects and particles.

In addition to the above described single wall ribbons, double-walled plastic film which is essentially a narrow hollow tube can be used. These "tubes" can be filled with air, carbon dioxide, argon, freon (gases) water, salt solutions, ethylene gylycol (liquids). This transforms the tier into an insulating barrier against heat and cold. It also becomes a potential solar energy storage system.

Figure 8:
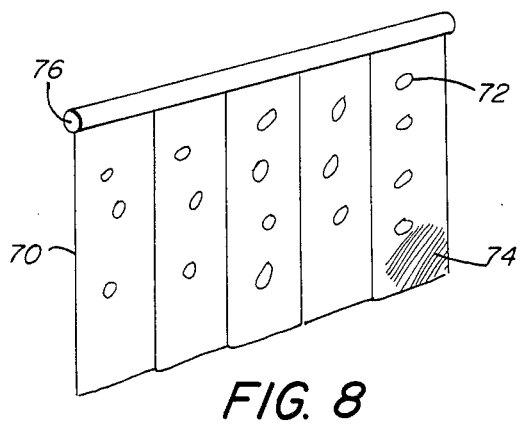
FIG. 8 is a front view of a tubular-ribboned tier.

Referring to FIG. 8, double-walled tubular ribbons 70, having many perforations 72, are made wide enough to contain thin-profiled evaporative pads 74 made of aspen fibers. Water dripping from a tubular saddle 76 passes into the perforations wetting the pads. The perforations 72 on the inwardly facing surfaces (with reference to the defined environment) allow control of humidity. The perforations 72 on the other side allow cooling of the air external to the structure by evaporation.

Figure 9:
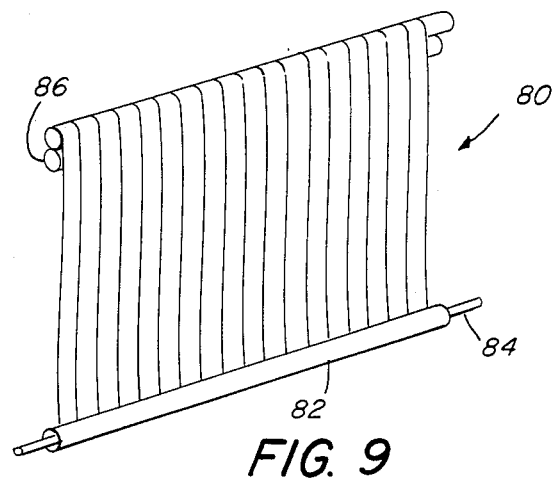
FIG. 9 is a front view of a retractable tier.

Referring to FIG. 9, a wall section tier 80 has a PVC tube 82 attached to it. This tube 82 limits the movement of the ribbons in high winds and minimizes soil erosion by slowing surface water runoff under heavy rainfall conditions. By passing a rod 84 through the tubing, the entire wall section can be lifted up to rest on a ridge plate 86.

Figure 10A:
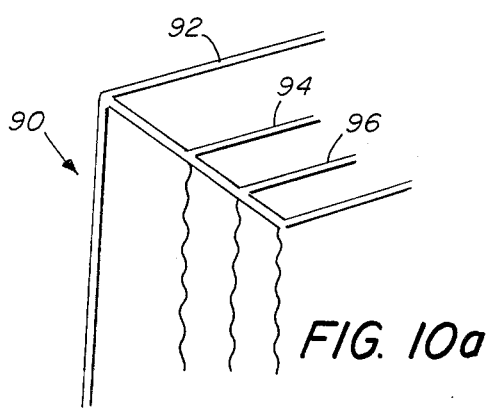
FIG. 10 is an illustration of a multi-tiered assembly.
Figure 10B:
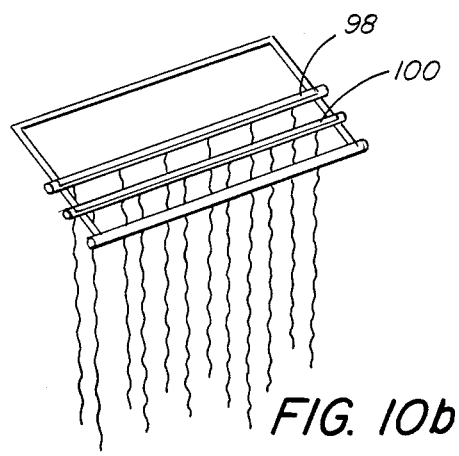

In FIG. 10a a frame is shown at 90 having a pole plate 92 and two purlines 94 and 96. Tiers 98 and 100 respectively shown in FIG. 10b are secured thereto to provide multiple, spaced-apart ribbon walls with the total structure, i.e. within the ribboned walls depending from the pole plates(s).

It will be appreciated that for the construction shown in FIGS. 1 and 3 that the framework or supporting structure must be capable of supporting loads under severe conditions, i.e. in addition to the static load on the tiers per se, winds and the like add to the dynamic load which must be supported. Further, where the structure of FIG. 1 is used as a dwelling for humans it would be appropriate to include corner posts for additional stability.

Although this aspect of the invention will be described in reference to PVC pipe which is modified to be more resistant to stress deformation under load, it is of course applicable to any tubular pipe whether plastic or metal. Preferably, the modified pipes described herein are used for the vertical posts, ridge poles, pole plates and purlines. However, they may be used for all pipes used in the structure. Their use will depend upon the loads to which the total structure will be subjected.

Figure 11:
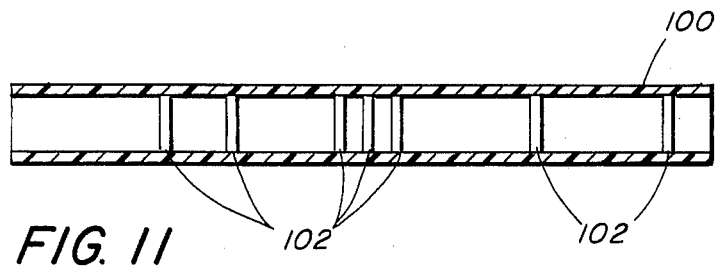
FIG. 11 is a side view of a specially configured pipe used as a frame member.
Figure 12:
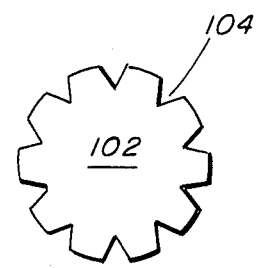
FIG. 12 is a front sectional view of a rib used in the pipe of FIG. 11.

As shown in FIG. 11, there is a pipe 100. Received within the pipe are a plurality of disc-like ribs 102, the outer edges of which are in contacting engagement with the inner surface of the pipe 100. The ribs 102 are aligned in spaced apart relationship within the pipe. The ribs may be equally spaced apart or they may be spaced apart in a non-uniform fashion depending upon the load to which it is expected the pipe will be subjected. That is, when it is known where the greatest load will be placed, the ribs are positioned in a pattern which will distribute the load for maximum effective resistance to deformation.

The ribs are received in contacting engagement within the pipe wall. By contacting engagement is meant when the pipe is subjected to static and/or dynamic loads, the outer surface of the disc will be in engagement with the pipe wall and not dislodge thereby improving lateral tension loading. Preferably the discs are fixedly secured within the pipe by adhesives. Alternatively, they may be fixedly secured such as by set screws or the like. In the preferred embodiment, the rid is inserted into the pipe and is made an integral part of the wall. This is accomplished by the use of an adhesive such as an epoxy or a PVC cement. To ensure this bond is adequate, the outside periphery of the rib is grooved to 104, see FIG. 12, which grooves act as reservoirs of the viscous cement. As the rib is inserted, the adhesive is smeared on the wall. The channels 104 will retain enough adhesive to create the bond when the disc is finally positioned. This provides a homogeneous uniform continuous structure.

Figure 13:
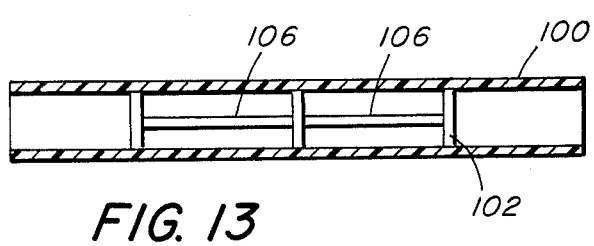
FIG. 13 is an alternative embodiment of FIG. 11.

In addition to the use of adhesives (or set screws) to secure the ribs they may additionally (or alternatively) be held in position by rod-like spacers 106 shown in FIG. 13. The spacer 106 may be adhesively engaged to the ribs or threaded thereto.

Although described in reference to PVC plastic for the pipes and ribs, other materials which are stronger or less expensive such as high impact styrene, ABS, Lexan ® or wood (ply wood or maple) which materials would allow latitude with regard to maximum effectiveness when compressive strength versus cost is considered.

The ribs may be of any geometric configuration such as a rod, a disc, polygon, (triangle, square etc.), depending upon the additional strength to be imparted to the basic pipe.

Figure 14:
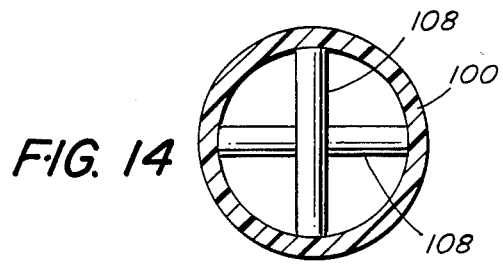
FIG. 14 is a front view of an alternative embodiment of a rib.

Referring to FIG. 14, a pipe 100 has small pipes 108, which are at right angles to one another, secured therein which function as a rib.

Figure 15:
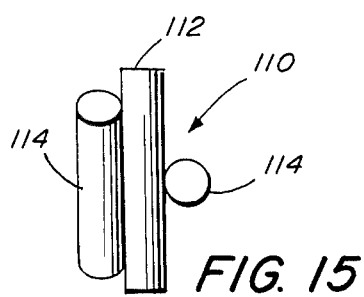
FIG. 15 is a side view of a further alternative embodiment of a rib.

Referring to FIG. 15, a hybrid rib is shown at 110 which comprises a disc 112 which is reinforced by short rods 114.

Figure 16:
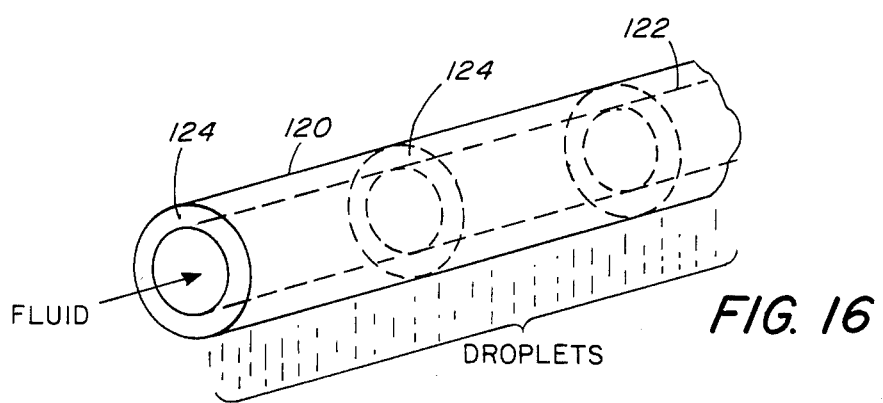
FIG. 16 is a perspective view of pipe for irrigation.

In FIG. 16, an outer water permeable pipe 120 has received therein an inner water permeable pipe 122. Ring-like discs 124 reinforce the pipe 120 and maintain the pipes 120 and 122 in axial alignment. Preferably, the pipes 120 and 122 are perforated whereby water introduced into pipe 122 flows into pipe 120 and is discharged into the environment defined by the structure for irrigation.

Having described my invention, what I now claim is:
1. A structure for defining a controlled environment which comprises:
    a skeletal framework formed of pipe-like members, at least some of said members having a plurality of disk-like ribs secured therein, the ribs secured within the pipe in spaced apart relationship by adhesives, the outer edges of the ribs having grooves and the adhesives are received in the grooves; and tiers secured to the framework to define the enclosed environment, said tiers each comprising a saddle secured to some of said members, ribbons secured to the saddle and extending downwardly, the ribbons extending from one end of the saddle to the other, the ribbons configured to allow moisture and air therethrough, to control radiation entering the controlled environment and further said ribbons being treated to inhibit the entry of deleterious substances into the defined environment.

2. The structure of claim 1 wherein the ribs are maintained in spaced apart relationship by spacers.

3. The structure of claim 1 wherein the ribs are arranged in the pipe in a uniform manner.

4. The structure of claim 1 wherein the ribs are arranged in the pipe in a non-uniform manner.

5. The structure of claim 1 wherein the ribbons comprise at least two distinct types of ribbons regarding their radiation controlling characteristics.

6. The structure of claim 1 wherein the tier comprises at least two distinct ribbons in regard to their opacity.

7. The structure of claim 1 wherein the ribbons define the total controlled environment.

8. The structure of claim 1 wherein the ribbons are characterized by solid particles on their surfaces to increase the surface area.

9. The structure of claim 1 wherein the ribbons are characterized by spangles on their surfaces to enhance the control of the temperature and light intensity within the structure.

10. The structure of claim 1 wherein the saddles are tubular and water is adapted to drip therefrom onto the supported ribbons.

11. A structure for defining a controlled environment which comprises:
a skeletal framework formed of pipe-like members, at least some of said members having a plurality of disk-like ribs secured therein, the ribs secured within the pipe in spaced apart relationship and rods secured to the ribs to enhance the strength of the ribs; and tiers secured to the framework to define the enclosed environment, said tires each comprising a saddle secured to some of said members, ribbons secured to the saddle and extending downwardly, the ribbons extending from one end of the saddle to the other, the ribbons configured to allow moisture and air therethrough, to control radiation enetering the controlled environment and further said ribbons being treated to inhibit the entry of deleterious substances into the defined environment.

12. The structure of claim 11 wherein the rods are disposed on either side of the rib.

13. The structure of claim 12 wherein the rods are disposed at right angles to one another.

14. The structure of claim 11 wherein the ribbons comprise at least two distinct types of ribbons regarding their radiation controlling characteristics.

15. The structure of claim 11 wherein the tier comprises at least two distinct ribbons in regard to their opacity.

16. The structure of claim 11 wherein the ribbons define the total controlled environment.

17. The structure of claim 11 wherein the ribs are arranged in the pipe in a uniform manner.

18. The structure of claim 11 wherein the ribs are arranged in the pipe in a non-uniform manner.

19. The structure of claim 13 wherein the ribbons are characterized by solid particles on their surfaces to increase the surface area.

20. The structure of claim 11 wherein the ribbons are characterized by spangles on their surfaces to enhance the control of the temperature and light intensity within the structure.

21. The structure of claim 11 wherein the saddles are tubular and water is adapted to drip therefrom onto the supported ribbons.

* * * * *